Sept. 12, 19    3,691,001
PROTECTING SHEATH OF AN ELONGATED
FLEXIBLE OPTICAL FIBER BUNDLE
Filed Nov. 12, 1969
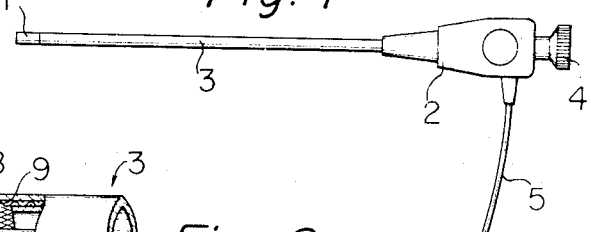
Fig. 1
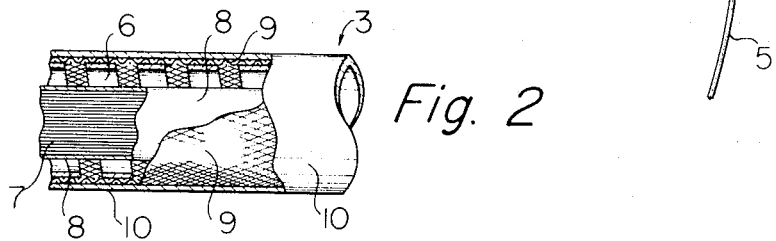
Fig. 2
Fig. 3
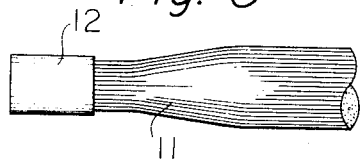
Fig. 4
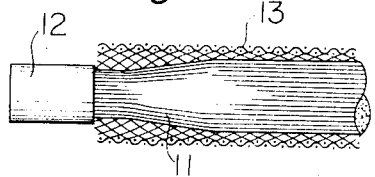
Fig. 5
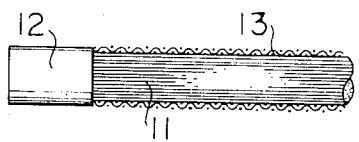
Fig. 6
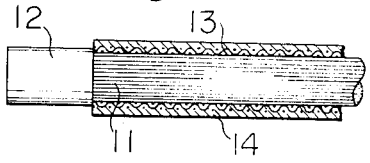
Fig. 9
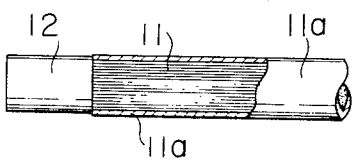
Fig. 10
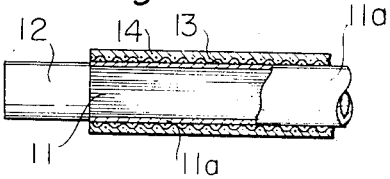
Fig. 7
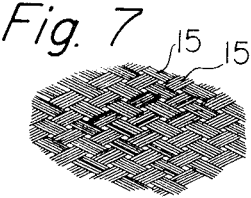
Fig. 8
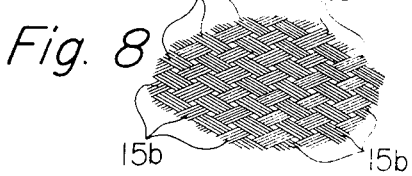
INVENTORS.
Nagashige Takahashi
Teruo Oouchi
By: Kilman and German
AGENTS

United States Patent Office 3,691,001
Patented Sept. 12, 1972

3,691,001
FLEXIBLE PROTECTING SHEATH OF AN ELONGATED FLEXIBLE OPTICAL FIBER BUNDLE
Nagashige Takahashi and Teruo Oouchi, Tokyo, Japan, assignors to Olympus Optical Co., Ltd., Tokyo, Japan
Filed Nov. 12, 1969, Ser. No. 875,836
Claims priority, application Japan, Nov. 14, 1968, 43/83,465, 43/99,327
Int. Cl. D06m; D06q
U.S. Cl. 161—96    4 Claims

ABSTRACT OF THE DISCLOSURE

Flexible protecting sheath on an elongated flexible optical fiber bundle such as used in an endoscope and method for forming the same. The protecting sheath comprises an elongated cylindrical braid member snugly fitted on the peripheral surface of the optical fiber bundle and impregnated with a synthetic resin material therewith to form the protecting sheath.

BACKGROUND OF THE INVENTION

The present invention relates to a flexible protecting sheath on an elongated flexible optical fiber bundle such as used in an endoscope and a method of forming the same.

An endoscope conventionally comprises a forward end portion having a viewing window and an illuminating window and a control housing connected to the forward end portion through an elongated flexible tube or sheath and provided with an eyepiece. An image transmitting optical fiber bundle extends through the flexible tube so that the image of an object received through the viewing window is transmitted to the eyepiece. A light conducting fiber optical system may extend through the flexible tube from an external light source to the illuminating window.

In general, the flexible tube comprises a helically wound metallic strip enveloping the image transmitting optical fiber bundle which is covered by a thin cylindrical tube made of a silicon resin and a net-like cylindrical braid member envelops the helically wound metallic strip which in turn is sealed in a protecting tube of synthetic resin.

The braid member keeps the helically wound strip against twisting elongation while it affords sufficient flexure.

Because the flexible tube of the conventional endoscope includes several members covering the optical fiber bundle and the thickness of the members is relatively great, thus the diameter of the optical fiber bundle must be made very small in comparison with the relatively large diameter of the flexible tube.

The present invention aims at avoiding the above described disadvantages of the known flexible tube in an endoscope and at providing a relatively thin flexible sheath for the optical fiber bundle in an endoscope and a method for forming the sheath.

SUMMARY OF THE INVENTION

The flexible protecting sheath of the present invention is characterized by an elongated cylindrical braid member snugly fitted on the optical fiber bundle and a synthetic resin material impregnated into the braid member to form a flexible protecting sheath of little thickness but providing sufficient strength and being impermeable to fluid.

A thin walled tube made of a synthetic resin material such as silicon resin material may be interposed between the optical fiber bundle and the braid member. It protects the optical fiber bundle against breakage due to contact with the braid member. A lubricating fluid or lubricating powder may be applied within the thin walled tube so as to increase the life of the optical fiber bundle.

Because of the snug engagement of the braid member impregnated with resin material with the optical fiber bundle the diameter of the sheath may be made extremely small while sufficient flexibility is maintained.

The braid member may be made of non-metallic textile fiber such as cotton and silk fibers with groups of fibers woven crosswise so as to form a cylindrical network-like structure. Metallic fibers may also be used to form the braid member, and the non-metallic and metallic fibers may be used in combination with groups of non-metallic and metallic fibers.

The cotton and silk fibers afford sufficient flexibility and firm bonding to the resin material impregnated therein, while the metallic fibers afford high mechanical strength such as resistance against twisting.

BRIEF DESCRIPTION OF THE DRAWINGS

FIG. 1 is a general view showing an endoscope of the prior art;
FIG. 2 is a fragmentary view partly in cross-section showing the construction of the flexible tube of the prior art endoscope;
FIG. 3 is a fragmentary view showing the optical fiber bundle to which the method of the present invention is to be applied;
FIG. 4 is a fragmentary view partly in section showing the first step of the method of the present invention to form a protecting sheath of the present invention;
FIG. 5 is a fragmentary view partly in section showing the second step of the method of the present invention;
FIG. 6 is a fragmentary view partly in section showing the final step of the method of the present invention;
FIG. 7 is a fragmentary view showing the structure of the braid member used in the present invention;
FIG. 8 is a view similar to FIG. 7 but showing another embodiment of the braid member; and
FIGS. 9 and 10 are fragmentary views showing the steps of the alternative type of the method of the present invention.

DETAILED DESCRIPTION OF THE PREFERRED EMBODIMENTS

Referring to FIG. 1 showing a prior art endoscope, a forward end portion 1 adapted to be inserted into a hollow portion to be inspected is connected to a control housing 2 through an elongated flexible tube 3, i.e., a protecting sheath. The forward end portion 1 houses therein an objective lens which receives light from an object through a viewing window and forms an image of the object on the forward end surface of an image transmitting optical system such as a fiber optical system extending through the flexible tube 3 from the forward end portion 1 to the control housing 2. The image of the object is transmitted through the image transmitting optical system to the rearward end surface thereof and is viewed by an operator through an eyepiece 4 provided in the control housing 2 behind the rearward end surface of the image transmitting optical system.

In order to illuminate the object, a light conducting fiber optical system is provided which extends through the flexible tube 3 from the forward end portion 1 to the control housing 2. The rearward end of the light conducting fiber optical system is connected to another light conducting optical system 5 adjacent to the control housing 2 to which an external light source (not shown) is connected to supply illuminating light to illuminate the object.

As shown in FIG. 2, flexible tube 3 of the prior art endoscope comprises helically wound metallic strip 6 loosely surrounding the image transmitting optical system 7 covered by a thin walled tube 8 of a resin material. A network-like cylindrical braid member 9 surrounds the helically wound strip 6 so that twisting and compression or elongation of the helically wound strip 6 are prevented while sufficient flexibility is maintained. A flexible cover tube 10 made of a synthetic resin material is provided around the braid member 9 so that the flexible tube 3 is sealed tightly toward the exterior.

The thickness of the members 6, 9 and 10 is relatively great, thus the outer diameter of the flexible tube 3 must necessarily be made great in order to locate therein an image transmitting optical system 7 having a sufficient diameter for necessary sharpness of the image transmitted therethrough.

This prevents the endoscope from being used for the inspection of the bronchi, the biliary duct and the like.

In accordance with the present invention, the outer diameter of the flexible tube, i.e., the protecting sheath can be made extremely small in comparison with a known tube having an image transmitting optical system of the same diameter.

FIGS. 3 to 6 show the steps of forming the protecting sheath of the present invention about an image transmitting fiber optical system 11 secured to a lens barrel 12 in which an objective lens is located.

In accordance with the method of the present invention, the fiber optical system 11 is loosely inserted into a slack, cylindrical braid member 13 as shown in FIG. 4 with the forward end thereof terminating at the rear end of the lens barrel 12. In this condition, the fiber optical system 11 is also slack. Then the braid member 13 is squeezed lengthwise together with the fiber optical system 11 inserted therein by means of a die, so that the diameter of the braid member 13 is reduced to snugly fit the peripheral surface of the fiber optical system 11 which is also contracted radially by the squeezing as shown in FIG. 5. Finally, the braid member 13 is dipped into a polyurethane or polyamide resin 14 in the liquid state so that the resin material 14 is impregnated into the braid member 13 and set therein to form the protecting sheath as shown in FIG. 6. Instead of dipping the braid member 13 into the liquid resin material, the resin material 14 may be applied by coating. The thus formed protecting sheath is sufficiently flexible and fluidtight.

FIG. 7 shows the structure of the braid member 13. As shown, the braid member 13 is comprised of groups of fibers 15 interwoven so as to form a network-like structure.

The fibers may be made of a non-metallic material such as cotton and silk and a metallic material.

The fibers of the non-metallic material afford superior bonding to the resin material but suffers from poor compressive strength, whereas the fibers of the metallic material afford high strength but form poor bonds with the resin material.

FIG. 8 shows an alternative structure of the braid member 13. In this braid member 13, alternating, parallel groups of metallic fibers 15a and groups of non-metallic fibers 15b are interwoven with alternating, parallel groups of metallic fibers 15a and groups of non-metallic fibers 15b so that the combined characteristics of both the non-metallic and metallic fibers are obtained.

FIGS. 9 and 10 show an alternative form of the protecting sheath of the present invention. The protecting sheath shown in FIGS. 9 and 10 is similar to that shown in FIG. 6, except that a thin walled tube 11a made of a resin material such as silicon resin is applied to the surface of the fiber optical system 11 prior to inserting the same into the braid member 13.

The thin walled tube 11a protects the fiber elements of the fiber optical system against breakage.

In order to increase the life of the fiber optical system 11, a lubricating liquid or a lubricating powder may be applied within the thin walled tube 11a.

The protecting sheath of the present invention has high flexibility and yieldability and relatively low elongation while the outer diameter is extremely small in comparison with the flexible tube of the prior art endoscope.

What is claimed is:

1. In an optical fiber arrangement, in combination:
   (a) a bundle of elongated, flexible, optical fibers;
   (b) an elongated, tubular braid member snugly fitted over said bundle, said braid member being constituted by groups of metallic fibers and groups of non-metallic fibers, said groups being interwoven; and
   (c) a synthetic resin material impregnated into said braid member.

2. In an arrangement as set forth in claim 1, said non-metallic fibers being of cotton or silk.

3. In an arrangement as set forth in claim 1, a thin-walled tube of synthetic resin material interposed between said bundle and said braid member.

4. In an arrangement as set forth in claim 3, a lubricant in said tube.

References Cited

UNITED STATES PATENTS

| | | | |
|---|---|---|---|
| 2,602,766 | 7/1952 | Francis | 161—178 XR |
| 3,244,894 | 4/1966 | Steele et al. | 350—96 XR |
| 3,357,423 | 12/1967 | Winchester et al. | 350—96 XR |
| 3,434,775 | 3/1969 | Gosselin | 350—96 |
| 3,457,000 | 7/1969 | Genahr | 350—96 |
| 3,498,286 | 3/1970 | Polanyi et al. | 350—96 XR |
| 3,534,652 | 10/1970 | Zumeta et al. | 87—1 |

FOREIGN PATENTS

| | | | |
|---|---|---|---|
| 789,972 | 7/1968 | Canada | 161—175 |

WILLIAM A. POWELL, Primary Examiner

U.S. Cl. X.R.

87—1; 156—278, 294; 161—98, 176; 350—96